United States Patent [19]

Sedlak

[11] 3,874,994

[45] Apr. 1, 1975

[54] PROCESS OF MAKING PAPER WHERE AN IONIC VINYLAMIDE POLYMER LATEX IS ADDED TO THE FURNISH TO IMPROVE DRY STRENGTH OF THE PAPER

[75] Inventor: John Andrew Sedlak, Stamford, Conn.

[73] Assignee: American Cyanamid Company, Stamford, Conn.

[22] Filed: Apr. 18, 1974

[21] Appl. No.: 461,818

Related U.S. Application Data

[62] Division of Ser. No. 211,624, Nov. 23, 1971.

[52] U.S. Cl. ............... 162/163, 162/167, 162/168, 162/180
[51] Int. Cl. ...................... D21h 3/02, D21h 3/38
[58] Field of Search . 260/29.6 TA, 80.73, 29.4 UA, 260/72 R; 162/168, 167, 163, 180

[56] References Cited
UNITED STATES PATENTS

| | | | |
|---|---|---|---|
| 3,323,979 | 6/1967 | Foster et al. | 162/167 |
| 3,539,535 | 11/1970 | Wisner | 260/72 R |
| 3,790,529 | 2/1974 | Fujimura et al. | 260/72 R |
| 3,840,489 | 10/1974 | Strazdins | 260/29.6 TA |

FOREIGN PATENTS OR APPLICATIONS

| | | | |
|---|---|---|---|
| 45-21241 | 7/1970 | Japan | 162/168 |

*Primary Examiner*—S. Leon Bashore
*Assistant Examiner*—William F. Smith
*Attorney, Agent, or Firm*—Evans Kahn

[57] ABSTRACT

Latices wherein the dispersed phase is a water-insoluble polymer which contains at least about 60 weight percent of unsubstituted acrylamide linkages at least about 5 weight percent of hydrophobic linkages at least about 2 weight percent of N-[di-($C_{1-3}$ alkyl) amino-methyl]acrylamide linkages and up to 10 weight percent of anionic linkages and which has a low molecular weight such that a 10% by weight dispersion of the polymer in water at pH 9.5 and 25°C. has a viscosity between 250 and 200,000 centipoises, are dry strengthening agents for use as beater additives in the manufacture of paper, particularly where the fibers are unbleached fibers and when the pulp contains black liquor.

7 Claims, No Drawings

PROCESS OF MAKING PAPER WHERE AN IONIC VINYLAMIDE POLYMER LATEX IS ADDED TO THE FURNISH TO IMPROVE DRY STRENGTH OF THE PAPER

This is a division of application Ser. No. 211,624, filed Nov. 23, 1971.

The present invention relates to aqueous latices of water-insoluble hydrophilic-hydrophobic vinylamide paper-strengthening polymers, to paper of improved dry strength resulting from a substantially uniformly distributed content of said polymers, and to processes for the manufacture of said latices and said paper.

The production of paper of improved dry strength from pulps composed of unbleached fibers, especially when the pulp contains black liquor, has presented a special problem to the paper manufacturing art. Most dry strength polymers (both anionic and cationic) of ordinarily excellent dry strengthening capabilities have provided a commercially inadequate amount of dry strength when used with such pulps. Whatever may be the reason for these failures, it has not as yet been found commercially practicable to employ synthetic polymers as dry strengthening agents in the manufacture of paper from unbleached fibers in aqueous media containing black liquor.

The discovery has now been made that certain vinylamide polymer latices possess valuable dry strengthening properties which render them useful as general-purpose strengthening agents in the manufacture of paper. These latices impart a substantial amount of dry strength when added to pulps composed of unbleached fibers, and even when the pulps have a content of black liquor in normal amount. The vinylamide polymers in the latices referred to are composed of at least 60 weight percent of unsubstituted acrylamide linkages, at least about 5 weight percent of hydrophobic vinyl linkages, at least about 2 weight percent of N-[di($C_{1-3}$ alkyl)aminomethyl]acrylamide linkages, and up to 10 weight percent of hydrophilic anionic linkages. The ratio among the linkages designated above is such that the polymer is insoluble in water, but is autodispersible or substantially autodispersible therein (i.e., so that it forms a stable noncreaming dispersion either when allowed to stand in water or when gently stirred therewith). The polymers have a low molecular weight, such that 10% by weight dispersions of the polymers in water at 25°C. and pH 9.5 have a viscosity in the range of about 250 to about 200,000 centipoises and preferably a viscosity in the range of about 500 to about 50,000 centipoises under the same conditions.

In the latices of the present invention, the polymer particles are so small that they do not settle out or cream when the latices are allowed to stand at room temperature at least for several days.

The latices of the present invention, in preferred embodiments, possess the following beneficial properties:

1. They impart very satisfactory dry strength when added to papermaking pulps of unbleached fibers (including mechanical pulp fibers), in the presence or absence of black liquor. Most previously known dry strength polymers impart no more than low dry strength when added to those pulps.

2. The latices are effective in papermaking systems which run in the normal pH range of 4 to 8. The paper manufacturer need not exercise close pH control.

3. The latices are effective in pulps which contain 500 to 1,000 parts of dissolved sulfate ions per million parts by weight of the pulp. The present invention therefore can be used in paper mills which employ a largely closed white water system.

4. The latices are not harmed and are usually benefited by the presence of customary amounts of dissolved alum in the papermaking fibrous suspension. The latices can advantageously be added to papermaking suspensions of fibers following application to the fibers of rosin or other soap size by the action of alum.

5. The polymers in the latices act as fortifying agents for rosin size and for the sizing solids in black liquor soaps (normally present in unbleached pulps). The polymer therefore permits the amount of rosin size needed to achieve a predetermined level of sizing to be decreased, and causes an increase in the amount of sizing imparted by black liquor soaps.

6. The latex is easily made without need for special equipment from inexpensive and commonly available raw materials.

The special superiority of the latices of the present invention as dry strengthening agents in the manufacture of paper from pulps of unbleached fibers is a consequence of the low to moderate molecular weight of the polymer and of the conjoint action of the di($C_{1-3}$ alkyl)aminomethyl and the hydrophobic substituents when they are present together in the polymer in the above-stated proportions. It is on the discovery of the strengthening properties possessed by polymers of the above description, when in latex state, that patentability of the present invention principally depends.

In the polymers of the latices of the present invention, the unsubstituted amide linkages provide dry strength once the polymers have been deposited on the fibers, and these linkages therefore are generally present in as high a proportion as possible. The hydrophobic vinyl linkages and the N-(dialkylaminomethyl)acrylamide linkages cooperate in depositing the polymer on the fibers over a broad pH and fiber composition range. The hydrophilic anionic linkages, when present, permit the polymers to provide better dry strengthening when applied to pulps which contain alum.

The latices of the present invention can be prepared from aqueous latices of water-insoluble polymers which comprise at least about 60 weight percent of unsubstituted vinylamide linkages and at least about 5 weight percent of hydrophobic vinyl linkages, the amount of hydrophobic vinyl linkages in the polymers being, if necessary, in excess of this amount so that the polymer is water-insoluble but is autodispersible or substantially autodispersible in water at room or elevated temperature to finely divided non-creaming (i.e., latex) state.

Suitable starting latices can be prepared by copolymerizing acrylamide with styrene, chlorostyrene, chloromethylstyrene, methyl acrylate, methyl methacrylate, propyl acrylate and isobutylene in about 90:10 weight ratio in each instance. Suitable starting latices can also be prepared by copolymerizing acrylamide with acrylonitrile in about 65:35 weight ratio. If desired, suitable starting latices can be prepared by copolymerizing acrylamide with mixtures of the foregoing hydrophobic monomers.

If desired, the polymer in the starting latex may contain a small proportion (up to about 10 weight percent) of hydrophilic anionic linkages. These can be provided by replacing a part of the unsubstituted vinylamide in the initial mixture of monomers with a corresponding amount of a water-soluble copolymerizable vinyl acid. Thus, a part of the starting acrylamide can be replaced by acrylic acid, maleic acid or methacrylic acid. If preferred, anionic substituents can be introduced into the polymer itself by hydrolyzing a portion of the acrylamide linkages, resulting in a polymer which contains acrylic acid linkages, preferably in the range of 2 to 8 percent. This may be done by heating a solution of the polymer at pH 10-12 at 50°C. until a desired proportion of anionic substituents have formed. The polymers can be prepared by standard emulsion polymerization method using deoxygenated water, an emulsifying agent, and ammonium persulfate as catalyst.

The starting latices for the preparation of the latices of the present invention have viscosities such that after the polymer content thereof has been reacted with formaldehyde and a water-soluble dialkylamine as described below, the resulting latex at 10% polymer content has a viscosity between about 250 and 200,000. Starting latices which have too high a viscosity, when reacted with formaldehyde and a water-soluble dialkylamine, yield latices which act principally as flocculants for the fibers and which possess inferior dry strengthening properties. Latices which have too low a viscosity possess inferior dry strengthening properties. Starting latices in the moderately low viscosity range (500 to 50,000 centipoises) are therefore preferred.

The latices of the present invention can be prepared by mixing formaldehyde and a di($C_{1-3}$ alkyl)amine into a latex or aqueous polymer suspension as described above, and allowing the mixture to stand at an alkaline pH (e.g., pH 10-12) and at about 10°C.-40°C. until the particles have become sufficiently cationic to be adsorbed by cellulose fibers in aqueous suspension at an acid pH (e.g. pH 4).

The formaldehyde and the amine interact to transform some amide linkages into N-[di($C_{1-3}$ alkly)aminomethyl]acrylamide linkages having a theoretical formula:

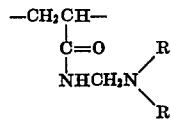

wherein the R's represent the same or different $C_{1-3}$ alkyl groups. Conditions suitable for the performance of this reaction (known as the Mannich reaction) are disclosed in U.S. Pat. Nos. 2,328,901 and 3,323,979.

The amounts of formaldehyde and dialkylamine which are added are each at least 0.02 mol per mol of vinylamide linkages in the polymer. This is about the minimum proportion of each reagent which is needed to produce a polymer which is significantly improved. Larger amounts of each reagent may be employed up to about 0.3 mol of each, which is regarded as the practical maximum.

If desired, the amine may be added in stoichiometric excess over the formaldehyde. The excess remains in the final latex and acts as stabilizer, retarding the rate at which the latex advances toward gelation. The optimum excess for the purpose has not been ascertained, but a sufficient excess is present when the number of mols of the amine is between about 1.25 to 2 times the number of mols of formaldehyde which are added. This excess provides a substantial stabilizing effect and is therefore preferred.

If preferred, the polymers of the present invention can be prepared by copolymerizing acrylamide with a hydrophobic vinyl compound and a N-[di-($C_{1-3}$ alkyl)aminomethyl]acrylamide in suitable proportions, with acrylic acid or other vinyl acid present if desired. The copolymerization is performed by the emulsion method described below.

The latex is prepared at a pumpable viscosity at 5%-20% polymer solids by weight and appears to be best stored at about pH 10. Before use, the latex is diluted with water to 0.1%-5% polymer solids content to facilitate metering and uniform distribution of the polymer throughout the fibrous suspension to which it is added.

Paper of improved strength is manufactured according to the present invention by forming an aqueous suspension of cellulose papermaking fibers having a pH in the normal paper-making range of 4 to 8, adding thereto sufficient of a latex as described above to provide a strengthening effect, forming the fibers into a web, and drying the web.

The fibers may be any of the fibers commonly used for the manufacture of paper and may be bleached or unbleached. The aqueous phase of the fibrous suspension may contain black liquor and alum. The suspension may have a content of dissolved sulfate ions as high as 500 to 1,000 parts per million parts by weight of the suspension. Moreover, the fibers before addition of the latex may be sized with rosin or other soap size, deposited by alum.

In the manufacture of paper from a pulp of unbleached fibers which contains black liquor and alum, best dry strength per unit weight of polymer added is generally obtained when the polymer contains a substantial proportion (e.g., 2 to 8 percent) of acrylic acid or other hydrophilic anionic linkages. When such linkages are present in the polymer, the alum acts as fortifying agent, increasing the dry strengthening properties of the polymer, particularly when the pH of the papermaking system is acidic.

In the manufacture of sized paper by a process according to the present invention wherein the fibers are sized with rosin or other soap size prior to addition of the polymer latex, the polymer acts as fortifying agent for the size, substantially increasing the resistance imparted by the size against penetration of the fibers by aqueous fluids. Accordingly, when the polymer latex of the present invention is added to a papermaking fibrous suspension, the amount of rosin size needed to meet a given sizing specification can be decreased or if the amount of rosin size added is maintained constant, paper of improved sizing properties is obtained.

The process of the present invention is also usefully applied to the manufacture of paper of newsprint grade from a pulp predominantly composed of groundwood fibers, a small proportion of longer fibers being generally present as necessary to improve the strength to meet the requirements of high speed presses. The white water systems used for the manufacture of such paper generally contain alum, and have a pH of 4 to 5. Therefore, best dry strength per unit weight of polymer latex added is generally obtained when the polymer contains both cationic and anionic linkages.

The polymer of the present invention is also usefully applied in the manufacture of paper from bleached cellulose fibers. Best strengthening is generally obtained when the fibrous suspension contains alum and the polymer contains 2 to 8 percent of acrylic acid linkages.

The latex of the present invention is best added to the papermaking pulp at a point as close to the fourdrinier wire as is practical. The latex, therefore, can be added at a point such as the head box or the fan pump.

The amount of latex which is added to the papermaking pulp is that which is sufficient to impart the desired strength improvement to the finished paper. In general, a sufficient amount is that which supplies an effective amount for the purpose in the range of 0.01% to 5%, based on the dry weight of the fibers.

The polymers of the present invention produce their strengthening effect when the paper is air dried, but this strengthening effect is not significantly harmed when the paper is dried at elevated temperatures. Accordingly, the paper may be dried on steam-heated drying rolls having surface temperatures in the range of 190°F.–250°F. as is customary.

In the specification and claims the term "latex" designates an aqueous dispersion of the polymer. The term "non-creaming" designates a latex of particles which do not noticeably rise or settle on standing in aqueous dispersion state. The term "hydrophilic-hydrophobic" means that the polymers contain hydrophilic and hydrophobic linkages.

The invention is more particularly described by the examples which follow. These examples are preferred embodiments of the invention and are not to be construed in limitation thereof. Unless otherwise stated, percentages represent weights based on the dry weight of the fibers.

EXAMPLE 1

The following illustrates the preparation of a latex of the present invention from a starting latex wherein the dispersed phase is a substantially non-ionic hydrophilic-hydrophobic vinyl polymer composed of acrylamide and styrene linkages in 89:11 molar ratio and containing substantially no anionic substituents. The latex contains 10% polymer by weight and at pH 4.5 and 25°C. has a viscosity of 2,200 centipoises.

To 1,000 g. of this latex are added with stirring 4.05 g. of 44% aqueous formaldehyde and 13.4 g. of 40% aqueous dimethylamine (a 100% molar excess). The mixture is allowed to stand 3 hours at 25°C., at which point the particles of dispersed polymer have become cationic and substantially all of the formaldehyde has reacted.

The latex is adjusted to pH 9.5 and 10% solids. It has a viscosity of 2,090 centipoises. When diluted with water to 0.5% solids and adjusted to pH 11 at 25°C. it has a viscosity of 4.7 centipoises in an Ostwald viscosimeter. The polymer contains about 5 mol percent of cationic linkages and a smaller proportion (about 1 mol percent) of acrylic acid linkages (formed by hydrolysis of amide substituents during the formaldehyde-dimethylamine reaction).

The product as viewed in a bottle is a white opaque latex. It does not cream or separate on standing 1 month at 23°C. and after one month possesses 100% of its initial dry strengthening properties.

The starting latex is prepared by agitating a mixture of 84.6 g. of acrylamide, 0.50 g. of ammonium persulfate, 15.4 g. of styrene, and 1 g. of sodium dicyclohexyl sulfosuccinate as emulsifier under a blanket of nitrogen in 665 cc. of deoxygenated water at 75°C. for 16 hours.

EXAMPLE 2

The following illustrates the preparation of a latex according to the present invention wherein the $di(C_{1-3}$ amine) is dipropylamine.

The procedure of Example 1 is repeated except that the dimethylamine is replaced by 12.6 g. of dipropylamine. A similar polymer is obtained.

EXAMPLE 3

The following illustrates the preparation of a latex according to the present invention wherein the hydrophobic linkage is an alkyl acrylate linkage.

The procedure of Example 1 is repeated except that the polymer in the starting latex is composed of acrylamide and methyl methacrylate linkages in 90:10 molar ratio. A similar latex is obtained.

EXAMPLE 4

The following illustrates the preparation of a latex according to the present invention from a polymer wherein the principal hydrophobic linkage is a short alkyl chain.

The starting latex is composed of acrylamide, acrylonitrile and isobutylene linkages in 75:4:21 molar ratio and is reacted with formaldehyde and dimethylamine by the method of Example 1. A similar latex is obtained.

The starting latex is prepared by introducing 24 g. of acrylonitrile, 0.77 g. of ammonium persulfate, 0.43 g. of sodium metabisulfite, 4 g. of sodium dihexyl sulfosuccinate and 300 cc. of water, into a laboratory rocking autoclave, adjusting the pH of the mixture to 3, purging the mixture of oxygen, cooling the autoclave and contents to −10°C., adding 56 g. of liquid isobutylene, sealing the autoclave, and rocking the autoclave for 24 hours at room temperature. The polymer is recovered by precipitation from acetone. A mixture of 10 g. of the polymer, 3 cc. of water, 70 g. of of concentrated $H_2SO_4$ and 100 g. of glacial acetic acid is stirred for 100 minutes at 65°C. The resulting polymer is recovered by precipitation from acetone and is composed of acrylamide, acrylonitrile and isobutylene linkages in 75:4:21 molar ratio.

EXAMPLE 5

The following illustrates the manufacture of paper of improved dry strength by a process of the present invention.

A suspension is prepared at 0.6% consistency from unbleached kraft fibers beaten to a Canadian standard freeness of 624 cc. and to this is added 3% (solids based on the dry weight of the fibers) of black liquor. The pH of the suspension is adjusted to 6.3 with sulfuric acid, and then 1% of alum (based on the dry weight of the fibers) is added. Three aliquots are taken. To two are added respectively sufficient of the latex of Example 1 to provide the amounts of polymer shown in the table below. The third aliquot is reserved as control. All three aliquots are adjusted to pH 5.5 and handsheets are formed therefrom at 50 lb. basis weight (25 inches × 40 inches/500 ream) by standard laboratory procedure. The wet webs are dried for 1 minute in a laboratory drum dryer having a drum temperature of 240°F. The sheets are conditioned by storage for 24 hours at 73°F. and 50% relative humidity and their dry strengths determined. Results are as follows:

| Run No. | % Polymer Added[a] | Dry Strength | |
|---|---|---|---|
| | | Burst[b] | Internal Bond[c] |
| Control | None | 40.5 | 0.80 |
| 1 | 0.2 | 47.1 | 0.107 |
| 2 | 0.5 | 52.7 | 0.199 |

[a] Based on dry weight of fibers.
[b] Lb./in.², by Mullen test.
[c] Ft.-lb./in.²

The results show that the polymer produced a major increase in the bursting strength and internal bond strength of the paper.

EXAMPLE 6

The following illustrates the effect of the polymer of the present invention in imparting dry strength and improved sizing in the manufacture of paper from unbleached rosin-sized fibers.

A papermaking suspension is prepared from unbleached fibers according to Example 5, except that no black liquor is added and the amount of alum is increased to 1.5%. Aliquots are taken and to each is added sufficient of a latex according to Example 1 and a commercial rosin size to provide polymer and rosin size in the amount shown in the table below. Appropriate controls are prepared. The suspensions are processed into paper and the dry strength of the paper determined by the method of Example 5. Sizing is determined by application of TAPPI 1082P ink. Results are as follows:

| Run No. | % Polymer Added[a] | % Size Added[a] | Dry strength | | Sizing[d] |
|---|---|---|---|---|---|
| | | | Burst[b] | Internal Bond[c] | |
| 1 | None | None | 37.0 | 0.066 | Inst. |
| 2 | 0.5 | None | 58.5 | 0.153 | Inst. |
| 3 | None | 0.15 | 35.1 | 0.059 | 124 |
| 4 | 0.5 | 0.15 | 53.6 | 0.151 | 960 |
| 5 | None | 0.25 | 31.9 | 0.059 | 361 |
| 6 | 0.5 | 0.25 | 55.1 | 0.133 | 1539 |

[a] Based on dry weight of fibers.
[b] lb./in.², by Mullen test.
[c] Ft.-lb./in.².
[d] Ink (seconds required for pool of ink to penetrate sheet).

The results show that the polymer acts as a fortifying agent for rosin size.

EXAMPLE 7

The following illustrates the effect which the pH of the suspension has upon the strengthening effect of the polymer of the present invention.

The procedure of Example 5 is repeated except that addition of black liquor is omitted and the aliquots are sheeted at pH values of 4.6, 5.6, 6.6 and 8.6. The pulps are processed into paper by the method of Example 5. The dry strengths of the resulting handsheets are as follows:

| Run No. | pH | % Polymer Added[a] | Dry Strength (Burst)[b] |
|---|---|---|---|
| 1 | 4.6 | None | 35.4 |
| 2 | 4.6 | 0.2 | 48.9 |
| 3 | 4.6 | 0.5 | 54.6 |
| 4 | 5.6 | None | 31.4 |
| 5 | 5.6 | 0.2 | 52.6 |
| 6 | 5.6 | 0.5 | 54.2 |
| 7 | 6.6 | None | 39.6 |
| 8 | 6.6 | 0.2 | 48.9 |
| 9 | 6.6 | 0.5 | 54.0 |
| 10 | 8.6 | None | 38.8 |
| 11 | 8.6 | 0.2 | 42.4 |
| 12 | 8.6 | 0.5 | 47.6 |

[a] Based on dry weight of fibers.
[b] lb./in.², by Mullen test.

Plots of these and other laboratory data show that the effect of pH over the normal papermaking range for unbleached kraft of 4 to 8 is minor.

EXAMPLE 8

The following illustrates the manufacture of sized paper from bleached fibers showing the effect of the polymer in improving dry strength and promoting sizing.

An aqueous suspension is prepared from 50:50 hardwood:softwood bleached kraft fibers having a Canadian standard freeness of 500 cc. To part of the suspension is added 2% of alum and to the other part is added 1.0% of rosin size and 2% of alum (solids based on the dry weight of the fibers). Aliquots are taken, and latex according to Example 1 is added in amount to supply the amounts of polymer shown in the table below. The pH of the aliquot is then adjusted to 5.3, and the suspensions are allowed to stand for several minutes to reach equilibrium, after which they are processed into paper by the method of Example 5 except that the handsheets are made at 100 lb. basis weight. Sizing is determined by edge wick method, to determine the suitability of the polymer-rosin size combination for use in the manufacture of milk carton stock. Results are as follows:

| Run No. | % Alum Added | % Rosin Size Added[a] | % Polymer Added[a] | Dry Strength (Burst)[b] | Sizing[c] |
|---|---|---|---|---|---|
| 1 | 2.0 | None | None | 69.7 | — |
| 2 | 2.0 | None | 0.25 | 76.3 | — |
| 3 | 2.0 | None | 0.50 | 78.7 | — |
| 4 | 2.0 | 1.0 | None | 63.4 | 4.91 |
| 5 | 2.0 | 1.0 | 0.25 | 70.9 | 2.91 |
| 6 | 2.0 | 1.0 | 0.50 | 74.8 | 2.07 |

[a] Based on dry weight of fibers.
[b] Lb./in.², by Mullen test.
[c] Edge wick test, using 1% aqueous lactic acid.

The results show that the polymer provided a very satisfactory improvement in dry strength and also improved the sizing imparted by the rosin size.

EXAMPLE 9

The following illustrates the effect of the latex of the present invention as strengthening agent in the manufacture of paper from typical newsprint furnish with and without a fixing agent for the polymer.

An aqueous suspension is prepared at 0.7% consistency from an 85:15 mixture of chemi-groundwood and bleached southern kraft fiber. The suspension has a Canadian standard freeness of 650 ml. To a portion of the suspension is added 1% of alum based on the dry weight of the pulp, and to another portion no alum is added. Both portions are adjusted to pH 4.5. Aliquots are taken and to each is added sufficient of a latex according to Example 1 to provide polymer in the amount shown in the table below. The suspensions are processed at pH 4.5 into handsheets at 100 lb. basis weight and the dry strength of the handsheets determined as shown in Example 5.

Results are as follows:

| Run No. | % Alum Added" | % Polymer Added" | Dry Strength | |
|---|---|---|---|---|
| | | | Burst" | Internal Bond" |
| Control A | None | None | 16.5 | 0.037 |
| 1 | None | 0.3 | 22.0 | 0.064 |
| 2 | None | 1.0 | 25.6 | 0.077 |
| Control B | 1 | None | 15.8 | 0.039 |
| 3 | 1 | 0.3 | 22.7 | 0.070 |
| 4 | 1 | 1.0 | 27.7 | 0.094 |

"Based on dry weight of the fibers.
"Lb./in.², by Mullen test.
"Ft.-lb./in.².

The results show that the polymer of the present invention is an effective strengthening agent for pulps which are substantially composed of unbleached groundwood fibers and that alum acts as a fortifying agent for the polymer when applied to such pulps.

EXAMPLE 10

The procedure of Example 1 is repeated except that the amount of dimethylamine is decreased by 50%. The resulting latex possesses similar dry strengthening properties but arrives at the gel point more rapidly.

EXAMPLE 11

The following illustrates the efficiencies of polymer latices of the present invention as a function of their viscosities.

Three polymer latices of the same composition are prepared at increasingly higher viscosities, and each is treated with formaldehyde and dimethylamine in the same manner to convert the same proportion of amide substituents to N-(dimethylaminomethyl)amide substituents, after which the respective dry strengthening efficiencies of the latices are determined. The viscosities of latices A and B are determined at 10% polymer solids content, pH 4.5 and 25°C. in a Brookfield viscosimeter.

Latex A

This is prepared by copolymerizing acrylamide with styrene in 89:11 molar ratio by the method of Example 1 except that no emulsifier is employed, the polymerization temperature is increased to 80°C. and the polymerization time is shortened to 5 ½ hours. The resulting latex has a viscosity of 880 centipoises.

To this latex is added 5 mol percent of formaldehyde and 10 mol percent of dimethylamine (based on the number of amide substituents in the copolymer) and the mixture is allowed to interact according to Example 1.

Latex B

The procedure for the preparation of latex A (including the formaldehyde-dimethylamine reaction) is repeated except that the copolymerization is performed at a lower temperature. The resulting latex (prior to the formaldehyde-dimethylamine reaction) has a viscosity of 13,100 centipoises.

Latex C

The procedure for the preparation of latex A is repeated except that the amount of ammonium persulfate catalyst is decreased by 50% and the polymerization temperature is decreased to 63°C. The resulting latex (prior to the formaldehyde-dimethylamine latex) at 10% solids is a non-pumpable gel. The latex is diluted with increments of water and the viscosities of these at pH 4.5 and 25°C. are determined as follows:

| Solids Content, % | Visc. Centipoises |
|---|---|
| 1.0 | 25 |
| 3.25 | 320 |
| 5.3 | 4,200 |
| 7.7 | 36,000 |

A plot of these data, extended, shows that at 10% solids the latex has a viscosity of about 100,000 centipoises.

The dry strengthening efficiencies of the resulting latices A and B are determined by the method of Example 5. The testing of latex C is performed in the same manner except that no black liquor is added to the paper pulp. Results are as follows:

| Latex Desig. | Visc. Cps.¹ | Run No. | Amt. Latex Added² | Paper Strength (Burst)³ |
|---|---|---|---|---|
| A | 880 | Control | None | 35.6 |
| | | 1 | 0.2 | 39.4 |
| | | 2 | 0.5 | 53.2 |
| B | 13,100 | Control | None | 32.8 |
| | | 1 | 0.2 | 40.4 |
| | | 2 | 0.5 | 49.0 |
| C | 100,000 | Control | None | 31.6 |
| | | 1 | 0.2 | 46.2 |
| | | 2 | 0.5 | 51.4 |

¹At 10% polymer content, pH 4.5 and 25°C., prior to formaldehyde-dimethylamine reaction.
²Polymer based on dry weight of fibers.
³Lb./in.², by Mullen test.

I claim:

1. A process for the manufacture of paper of improved dry strength which comprises forming an aqueous suspension of cellulose papermaking fibers having a pH between 4 and 8, adding thereto a polymer latex in amount sufficient to provide from about 0.01% to 5% of polymer based on the dry weight of the fibers, forming said fibers into a web, and drying said web; the polymer of said latex consisting essentially of at least 60 weight percent of unsubstituted acrylamide linkages as dry strengthening components, and at least about 5 weight percent of hydrophobic vinyl linkages and at least about 2 weight percent of N-[di($C_{1-3}$ alkyl)aminomethyl]acrylamide linkages as components improving the adsorptivity of said polymer by cellulose fibers in aqueous suspension, said polymer containing up to about 10 weight percent of anionic linkages, the ratio among said linkages being such that the polymer is insoluble in water but is substantially autodispersible in water forming a non-creaming dispersion therein, said latex at 10% by weight polymer solids content, pH 9.5 and 25°C. having a viscosity between about 250 and 200,000 centipoises.

2. A process according to claim 1 wherein the fibers are unbleached fibers and the suspension has a content of black liquor solids.

3. A process according to claim 1 wherein the fibers are rosin-sized fibers.

4. A process according to claim 1 wherein the fibers are predominantly groundwood fibers.

5. A process according to claim 1 wherein the suspension has an acid pH and no fixing agent is present in the suspension.

6. A process according to claim 1 wherein the aqueous phase of the suspension has a dissolved content of alum.

7. A process according to claim 1 wherein the web is dried at a temperature in excess of 190°F.

* * * * *